A. O. POWELL.
WILLOW TWIG PEELING MACHINE.
APPLICATION FILED OCT. 8, 1914.
1,167,015.
Patented Jan. 4, 1916.
3 SHEETS—SHEET 2.
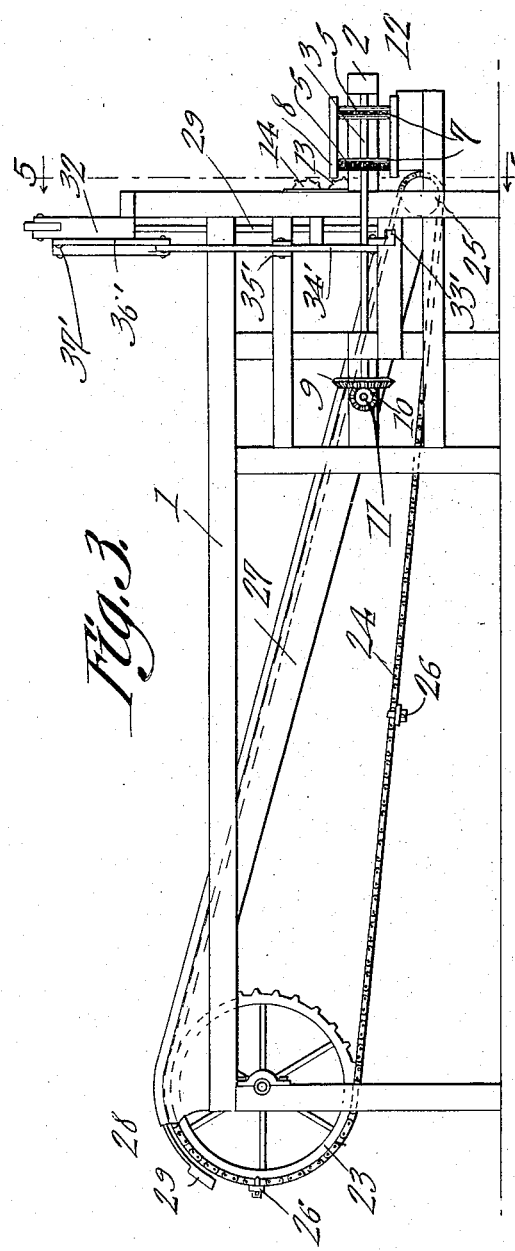
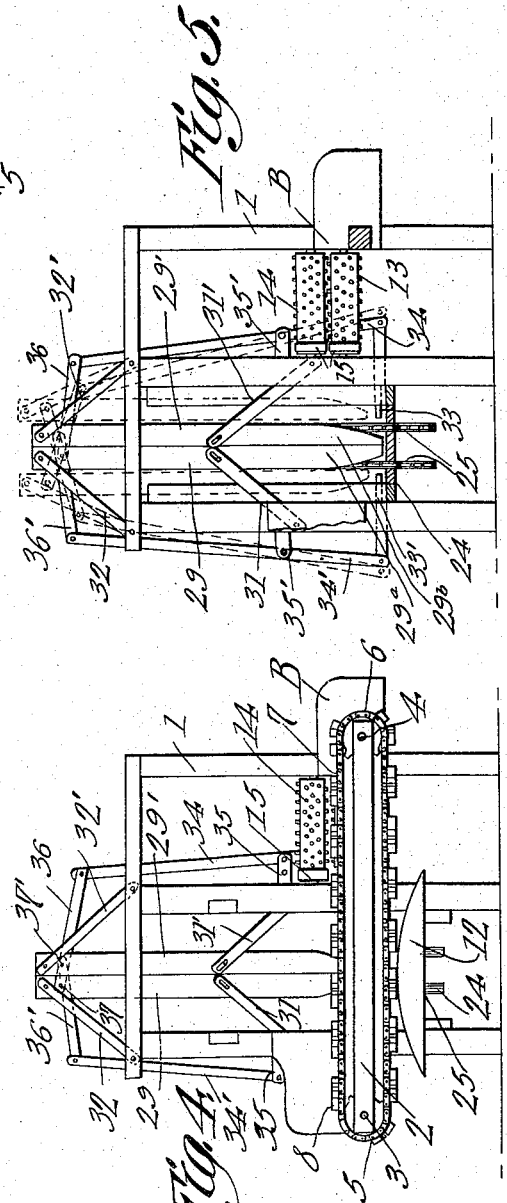
Witnesses
A. O. Powell
Inventor
by C. A. Snow & Co.
Attorneys

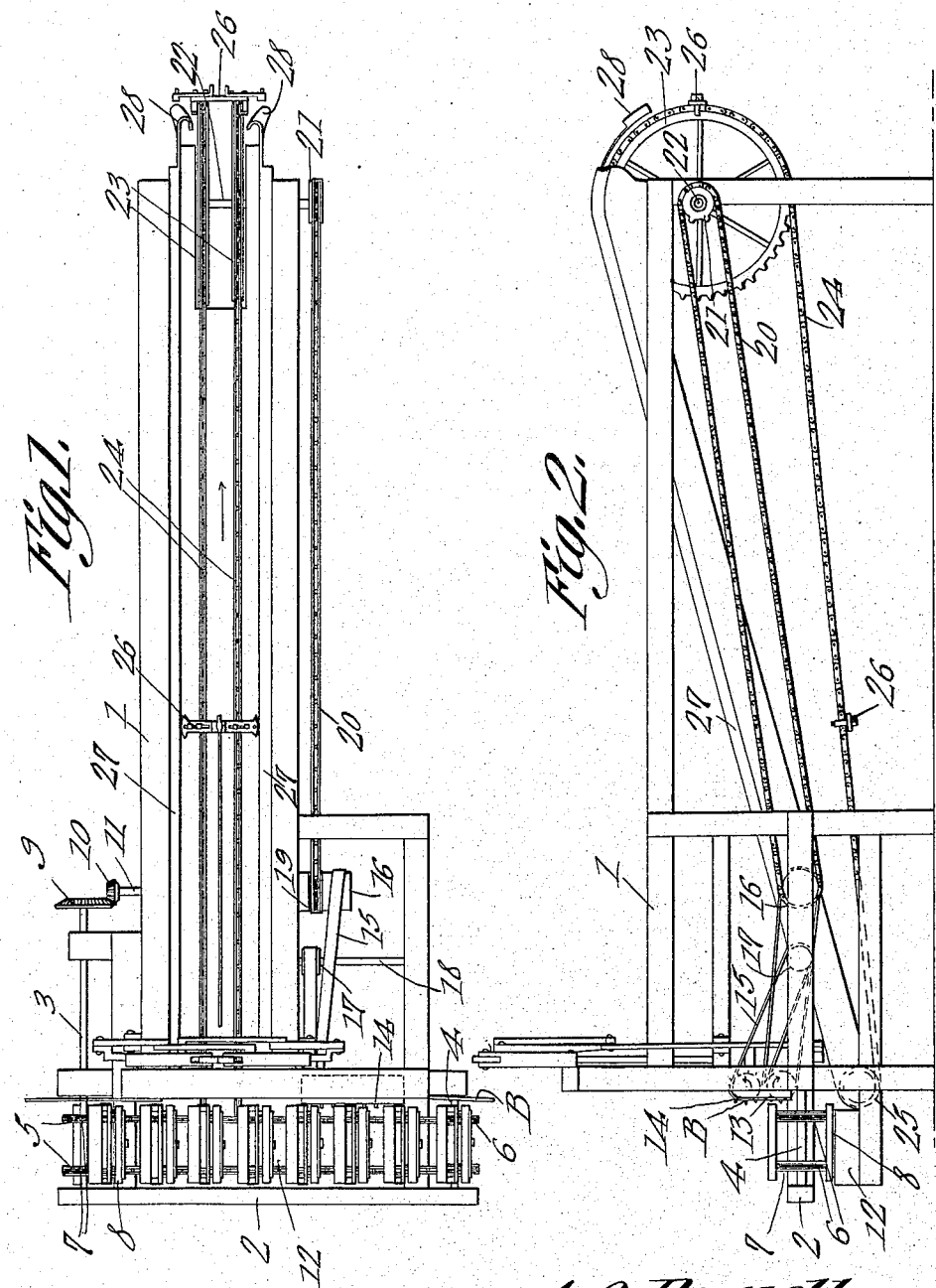

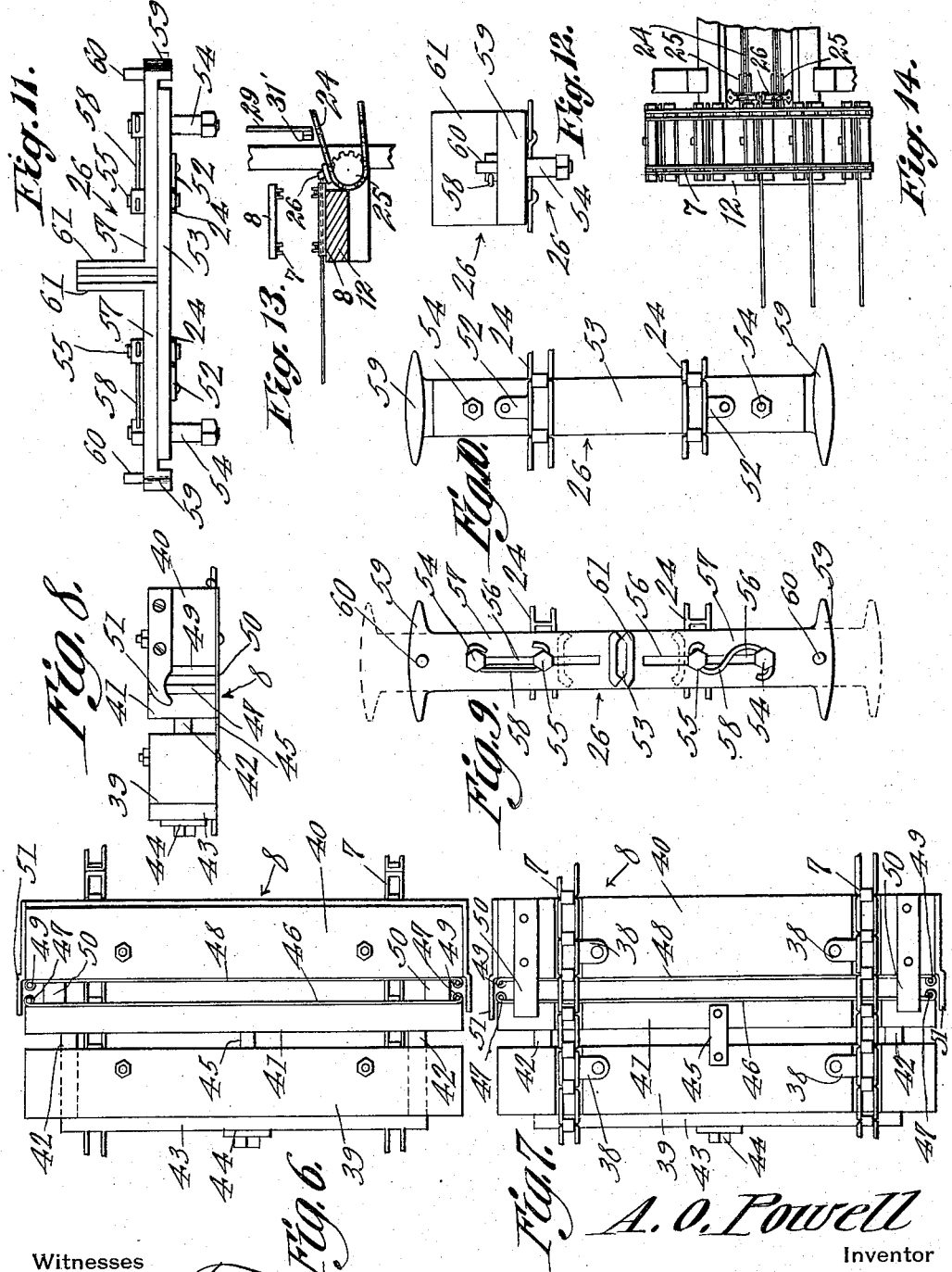

UNITED STATES PATENT OFFICE.

ALBERT O. POWELL, OF REEDSBURG, WISCONSIN.

WILLOW-TWIG-PEELING MACHINE.

1,167,015.                    Specification of Letters Patent.           Patented Jan. 4, 1916.

Application filed October 8, 1914. Serial No. 865,695.

*To all whom it may concern:*

Be it known that I, ALBERT O. POWELL, a citizen of the United States, residing at Reedsburg, in the county of Sauk and State of Wisconsin, have invented a new and useful Willow-Twig-Peeling Machine, of which the following is a specification.

The present invention relates to improvements in willow twig peeling machines, one object of the invention, being the provision of a machine, having means for receiving the willow, removing the bark from the butt end thereof to permit the gripping thereof by a gripping mechanism, such means for holding and delivering the willow twig at such time constituting the scraping means after the bark has been removed from the butt end and is delivered to the conveying mechanism.

A further object of the present invention, is the provision of a machine of this character, which after the butt end has been cleaned, the stalk portion will also be peeled and the final particles adhering thereto will also be removed.

A still further object of the invention, is the provision of automatic means, which after the twig has once been placed within the scraping mechanism will be properly adjusted therein after the bark has been peeled from the butt end thereof previous to the delivery of the butt to the conveying mechanism which draws the same through the scraping mechanism to remove the greater part of the bark therefrom, there being disposed an auxiliary means for removing the final particles from the twig, such conveying mechanism also being provided with means for releasing the twig at any desired point.

A still further object of the invention, is the provision of a simple machine of this character, in which all of the mechanisms are so constructed and timed as to operate in perfect accord to produce the desired result.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of a complete machine made according to and embodying the present invention. Fig. 2 is a side elevation thereof taken from the power side thereof. Fig. 3 is a side view taken from the opposite side. Fig. 4 is a front elevation of the complete machine. Fig. 5 is a section taken on line 5—5 of Fig. 3. Fig. 6 is a top plan view of one of the twig conveying and scraping members. Fig. 7 is a bottom plan view thereof. Fig. 8 is an end view thereof. Fig. 9 is a top plan view of one of the grippers and conveying members, dotted lines illustrating the extended position of the parts thereof. Fig. 10 is a bottom plan view of such members. Fig. 11 is a front view thereof. Fig. 12 is an end view thereof. Fig. 13 is a vertical sectional view delineating two of the coöperating gripping mechanisms. Fig. 14 is a top plan of the structure shown in Fig. 13.

Referring to the drawings, the numeral 1 designates the supporting structure for the present mechanism, which has disposed at the front thereof, the auxiliary frame 2 in which is journaled the two shafts 3 and 4. Carried upon the shaft 3 are the two sprocket wheels 5, while carried upon the shaft 4 are the two sprocket wheels 6 for the reception of the two sprocket chains 7, said chains being disposed to be moved from left to right as seen in Fig. 4. Carried by the two chains 7, and extending transversely of the frame 2, are a plurality of twig grippers 8, which also constitute the main bark scrapers. The detailed construction of these will be set forth later on when particular reference is made to Figs. 6, 7 and 8.

Fixed upon the shaft 3 at the rear of the auxiliary frame 2, is a beveled gear 9 which is in mesh with the beveled gear 10 upon the transverse shaft 11, which in reality is the power shaft of the present mechanism. It will thus be seen that when the shaft 11 is rotated, the shaft 3 is rotated and in turn operates the endless chains 7, so that the members 8 are properly actuated, said members being made in two sections, so that such sections open as the members pass over the respective sprocket wheels 5 and 6. Mounted at the front end of the machine below the auxiliary frame 2, is a cam block 12 which coöperates with the two sections of the members 8 as they pass thereover to assist in more firmly grasping the twig when the same is being gripped and conveyed thereaway-from.

In order to provide a means for tearing and removing the bark from the butt of the twigs before the same are finally gripped and peeled throughout their length, there is disposed at one side of the machine at the base thereof, the two spiked rollers 13 and 14, said rollers being operated by a single belt 15, which is twisted about the driving pulley 16 upon the shaft 11 and over one end of the roller 14 downwardly and around the pulley 17 upon the short transverse shaft 18, forwardly around one end of the roller 13 and finally back to the pulley 16. Thus it will be seen that the single belt operated from the pulley 16 upon the drive shaft 11 will rotate both spiked rollers 13 and 14 in unison, and in the direction of the arrows as illustrated in Fig. 2 so that the bark upon the butt end of the twig disposed thereat will be removed. Disposed at the side of such rollers, at the extreme right hand side of the machine as viewed in Figs. 4 and 5 is a plate B, which is a butt end adjuster, and operates upon the butt end of the willow after the rollers 13 and 14 have removed the bark therefrom so as to adjust such end a certain distance within its respective scraping member 8, so that when the willow is brought beyond the right hand end of the conveyer and below, the butt ends will extend the same distance, the purpose of which will presently appear.

Fixed upon the shaft 11 is a sprocket 19, which receives the sprocket chain 20, so that the chain may operate through the sprocket 21, the transverse shaft 22, which is journaled at the extreme outlet end of the frame 1 and carries thereupon, the two large sprocket wheels 23 which in turn carry the sprocket chains 24 of the main conveying mechanism, the forward ends of said chains being trained over the sprockets 25 at the lowermost end of the inclined conveyer portion of the frame. It will thus be seen that by means of the shaft 11, that the conveying chains 24 will be operated to move in the direction of the arrow as illustrated in Fig. 1, so that the butt gripping members 26 carried thereby will at the proper time, as will presently appear, grip the butt of the willow or twig presented thereto at the front end of the machine and pull the same so that the bark will be stripped therefrom and so that when the member 26 has arrived at the outlet end such members will open to permit of the delivery of the peeled twig. Disposed adjacent to and at opposite sides of the conveyer chains 24, are the upstanding rims 27, which coöperate with the arms 28 to actuate the gripper into gripping and releasing positions, as will presently appear.

*Willow gripping and scraping device.—* The device 8 as illustrated in diagram in the main figures and as shown in detail in Figs. 6, 7 and 8, consists of the two parallel blocks or members 39 and 40, which are connected together by means of the chains 7, one link of each of which is connected by the lug 38 to the under side of the members 39 and 40 respectively, as clearly illustrated in Fig. 7. Thus the members 39 and 40 as they pass around the respective sprockets at the end of the conveyer are permitted to move farther apart, this being provided for so that the operator standing at the left of the machine, as shown in Fig. 4, may insert one willow at a time within the device 8, so that the same will be properly gripped and held therein when the device is moved to the upper layer of the conveyer, the same being held fixedly therein during the scraping of the butt between the spiked rollers 13 and 14 and being released when passing the sprockets 6 so that the butt end may engage the adjusting device or plate B to slide the willow longitudinally and thus insure the projection of the butt in each device 8 a predetermined distance before the willow is again gripped and moved by the lower train of the chains from the right to the left hand side of the machine. In order to provide a resilient means for receiving and holding the willow in place, the plate 41 is provided with the pins 42 which are slidably mounted through the block or member 39, the free ends being disposed against the flat spring 43, which is clamped to the block 39 at the opposite side to the plate 41 by means of a bolt 44. The spring 43 may be in the form of a strip of tough wood, such as hickory. Attached to the forward face of the plate 41 is a metal plate 46, which is provided with the curled or rounded willow engaging ends 47, which coöperate with similar ends 49 of the plate 48, which is attached to the opposed face of the member 40. Thus the willow is adapted to be disposed between the respective plates 46 and 48 and is gripped by the scraping projections 47 and 49 thereof. In order to limit the forward projection of the plate 41, there is attached to it and the member 39, at the lower or inner side thereof, a flexible connection 45.

In order to prevent the willows from falling between the plates 41 and the member 40, there is attached to the under side of the member 40 the two plates 50, whose free ends underlie the plate 41.

In order to provide a means for preventing the willow from leaving the device 8 as it passes over the sprockets 6, and before it is finally gripped due to the closure of the plate 41 and block 40, the hooked members 51 are attached to the outer ends of the block 40, the hooked terminals of the same being projected beyond the ends of the block 40 and the plate 41. It will thus be seen that when the device 8 passes over the sprockets 5, that the same will cause an opening of the blocks 39 and 40, so that the space between the peeling or gripping ends 47 and 49 of the plates 46 and 48 will be widened to permit of the operator placing a willow therein, with the butt end toward the back of the machine, such butt end being projected some distance beyond the inner end of the device, so that when the conveyer moves the same to the bark peeling rollers 13 and 14, a sufficient projection of the butt end will be had, to clean the same of the bark, before the blocks 39 and 40 are again released or separated due to the position thereof upon the sprockets 6. At this point, the end engages the butt end adjusting plate B, and the willow is moved toward the front of the machine in its holding device 8, but due to the hooks 51, it is prevented from falling out as the device 8 moves to the under side of the conveyer. As soon as the device is in a position parallel to the upper strand, the members 39 and 40 are again brought together to cause the edges 47 and 49 to grip the willow with its butt end properly adjusted. As the lower strands of the conveyer chains 7 are moved toward the left of the machine, the device 8 will ride upon the upper surface of the tightening device 12, so that the blocks 39 and 40 will be caused to flex and bring the gripping ends 47 and 49 in closer proximity to each other and upon the willow, the spring 43 relieving any undue compression that might tend to tear or break the willow. While in this position, the butt end is presented to and gripped by the gripping device 26, as will presently appear.

*Gripper device.*—In the construction shown in Figs. 9, 10, 11 and 12, the gripper 26, consists of a plate or bar 53 which is attached to a lug 52 carried by one of the links of the respective chains 24, so that such gripper device may be attached to both chains. Attached to the plate or bar 53, are two pins 54, one adjacent each end thereof, while also carried thereby and in line therewith, are the two pins 55, said pins 55 being extended through the slots 56 of the two movable plates or members 57. These pins 55 carry locking members 58, which hold the plates 57 upon the upper face of the bar 53. Thus as the device 26 is carrying the twigs, it moves in the direction of the arrow Fig. 1, and the plates or members 57 will be upon the upper side, while when moved toward the front of the machine they will be upon the under side, the same being properly held in position as before stated by means of the wire clamps or holders 58.

Formed integral upon the outer end of each of the plates 57 is a shoe 59, which is adapted to coöperate with the guiding wall 27 of the conveyer portion of the frame, so that the plates 57 will be held inwardly, with the upstanding gripping devices or lugs 61 in engagement with the willow. Thus as these shoes are operated by the upstanding walls 27 to hold the plates 57 with the lugs 61 clamped upon the willow, the end of the willow having been placed therein by the moving device 8, it is desirable that some means be provided for moving them in the opposite direction or to assume the dotted line position as shown in Fig. 9 so that the lugs 61 will release the willow and permit the same to be delivered or dropped at the proper point. Therefore the pins 60 are carried by the members 57 in an opposite direction to the shoes 59 or upon the upper face thereof so as to engage the releasing arms 28 disposed at the outlet end of the conveyer and which slightly converge relatively to the walls 27, and which terminate at this point to release the shoes 59. Thus the pins 60 pass exteriorly of and engage the arms 28 to slide the plates 57 apart to release and permit the delivery of the willow at the outlet end of the machine. As the device 26 is moved toward the front of the machine, the shoes 59 engage the end of the walls 27 at the inlet end of the machine and thus bring the lugs 61 together, and upon the butt end of the willow which at that time is so positioned by one of the devices 8. As the device 8 at this time rides upon the highest or center portion of the coöperative cam block 12 the sections of the clamping member are forced more tightly together upon the willow, so that during the movement of the device 8 at the lower side of the chains 7 from left to right as illustrated in Fig. 4, the member 26 will have gripped the butt end of the willow and due to the chains 24 moving in the direction of the arrow shown in Fig. 1 and at much greater speed than the chains 7 the willow is in reality snatched from between the gripping members 47 and 49 of the blocks 39 and 40 and the bark is peeled off, before the blocks 39 and 40 have been released, the flexibility of the willow permitting the movement of the device 8 to the left or toward the sprockets 5 without damaging the fiber of the same.

The chains 24 are operated at a much greater speed than the chains 7, and there are a greater number of gripping devices 8 than grippers 26, the timing of these operations being such that one of the grippers 26 arrives at the proper time to receive and grip the butt end of a willow carried by a device 8; and as before stated the ratio speed between the two is so great, that the device 26 in reality snatches the willow through the slowly moving device 8.

*Auxiliary stripper device.*—In order to provide a means for insuring the removal of all particles of bark from the willow before the same is delivered at the outlet end of the conveyer, there is disposed at the inlet end of the machine, the two members 29 and 29', which are provided with the willow receiving and gripping members 29$^a$ and 29$^b$. These members are disposed to be slightly elevated and opened and closed as illustrated in full and dotted lines in Fig. 5, such action being automatic, and timed according to the position of the shoes 59 of the devices 26, as they approach and enter the inlet end of the conveyer and during the time that they grip the butt end of the willow, and are drawing the same through the gripping devices 8. These members 29 and 29' are supported respectively by means of the pivoted links 31—32 and 31'—31' which are connected so that such members 29 and 29' will be properly moved into and out of the path of the members 26 and in position to grip the willow intermediate of the gripping member 26 and the scraping member 8. Thus the members are given a slight vertical movement as they are separated and are slightly lowered when brought together upon the willow.

In order to provide a means for imparting this movement to the members 29 and 29', so that such members will be operated simultaneously, these are disposed at opposite sides of the guides 27 and projected therethrough in the path of the shoes 59, the pins 33 and 33' which are operably connected to the levers 34 and 34'. These levers 34 and 34' are pivoted intermediate of their ends to the lugs 35 and 35' mounted upon the frame of the machine, while the upper ends thereof are connected to the links 36 and 36', which are connected respectively by means of the pins 37 and 37' to the upper end of the members 29 and 29'. Thus the pin 33 for operating the member 29 is at the right hand side of the guide way 27 as viewed in Fig. 5 while the pin 33' for operating the member 29' is disposed at an opposite side to the pin 33 or at the left hand side.

*Operation.*—From the foregoing description, taken in connection with the drawings, the operation of the present machine is readily understood, but briefly stated it is as follows: Assuming the operator to be standing at the front of the machine as illustrated in Fig. 4, the device 8, which is positioned at approximately the upper left hand portion of the sprocket 5 will be in open position to receive the willow, said willow being presented therein with the butt end away from the operator. As the conveyer is moved from left to right, the plate 41 is moved toward the plate 40 so as to grip the willow between the gripping edges 47 and 49, said willow being disposed longitudinally between the plates 40 and 41. At this time the butt end is projected a sufficient distance to, when the same reaches the peeling rollers 13 and 14, be projected therebetween, so that the spikes of such rollers will lacerate and remove the bark from the thus projected butt end. As the thus scaled or peeled butt end is moved adjacent to the plate B, the plates 40 and 41 will be separated due to the passage of the device 8 over the sprockets 6, so that the willow therebetween will be moved toward the front of the machine and the butt end will be thus arranged so that the butt of each willow will be protected only a predetermined distance. As the hooks 51 are so disposed as to prevent the willow from falling out of the device 8 as it is moved at the lower side of the sprockets 6, the twig will be held therein until the plates 40 and 41 are again moved toward each other due to the straightening out of the chains 7 upon the lower strand thereof. As the conveyer is moved toward the sprockets 5, the face thereof engaging the cam member 12 will slightly raise the device and thus more greatly produce and increase the gripping action upon the plates 40 and 41, so that the willow will be firmly held at 47—49, while simultaneously with this action, the lugs 61 of the device 26, which have been previously opened, will receive the projected butt end, as the member 26 enters the space between the closing walls 27, at which time, the lugs 61 are brought together upon and grip the butt end of the willow.

The movement of the sprocket chains 7 and 24 are so timed, that the device 26 is in the position to receive the butt end of the willow gripped in the device 8, and as the device 8 rides over the cam 12, it is evident that the willow will be gripped within the device 8, and that therefore as the same is moving to the left, and as the device 26 is moving at right angles thereto that a pulling upon the willow will result that will cause the bark to be peeled as the willow is pulled between the engaging ends 47 and 49 of the members 40 and 41.

The members 29 and 29' as soon as the member 26 engages the pins 33—33', will be moved to the dotted line position as shown in Fig. 5, so that the device 26 can pass thereby without being obstructed, the instant that the same passes to release the pins 33—33', the members 29—29' will assume the full line position and thus cause the portions 29$^a$ and 29$^b$ thereof to engage the willow at a point adjacent to the lugs 61 or intermediate of the devices 26 and 8, the willow being thus drawn through the auxiliary scrapers 29 and 29' so that any particles of bark adhering thereto after having left the device 8 will be entirely removed. As the device 26 moves in the direction of the arrow as shown in Fig. 1, the pins 60 will be brought into engagement with the releasing members 28, so that the lugs 61 will be separated to permit of the release of the willow, which is directed over the outlet of the machine butt downwardly.

What is claimed is:

1. A machine of the character described, including a supporting structure, an endless conveyer mounted transversely at the forward end of the machine, a plurality of twig grippers and scrapers carried thereby, a second conveyer disposed at right angles to the first conveyer and intermediate of the ends of the first conveyer, and a plurality of butt end grippers carried thereby and disposed to operate in consonance with the grippers and scrapers to receive and pull the twigs therefrom during the gripping of the twig therewithin.

2. A machine of the character described, including a supporting structure, an endless conveyer mounted transversely at the forward end of the machine, a plurality of twig grippers and scrapers carried thereby, each of the latter comprising two longitudinally spaced sections flexibly connected together and disposed to be separated during the passage at the respective ends of the conveyer, a second conveyer disposed at right angles to the first conveyer and intermediate of the ends of the first conveyer, and a plurality of butt end grippers carried thereby and disposed to operate in consonance with the grippers and scrapers to receive and pull the twigs therefrom during the gripping of the twig therewithin.

3. A machine of the character described, including a supporting structure, an endless conveyer mounted transversely of and at the forward end of the machine, a plurality of twig grippers and scrapers carried thereby, a second conveyer disposed at right angles to the first conveyer and intermediate of the ends of the first conveyer, a plurality of butt end grippers carried thereby and disposed to operate in consonance with the grippers and scrapers to receive and pull the twigs therefrom during the gripping of the twig therewithin, and two toothed rollers journaled in the supporting structure and parallel to the path of travel of the first conveyer for receiving the butt ends of the twigs to lacerate the bark and remove the same therefrom preparatory to the delivery thereof to grippers of the second conveyer.

4. A machine of the character described, including a supporting structure, an endless conveyer mounted transversely at the forward end of the machine, a plurality of twig grippers and scrapers carried thereby, each of the latter comprising two longitudinally spaced sections flexibly connected together and disposed to be separated during the passage at the respective ends of the conveyer, a second conveyer disposed at right angles to the first conveyer and intermediate of the ends of the first conveyer, a plurality of butt end grippers carried thereby and disposed to operate in consonance with the grippers and scrapers to receive and pull the twigs therefrom during the gripping of the twigs therewithin, and auxiliary bark removing means disposed to engage the twigs simultaneously with the scraping operation.

5. A machine of this character, having an endless conveyer, a plurality of twig grippers and scrapers carried thereby, each of the latter including two gripping members, a resilient twig contact member carried by one of said members, and coöperative means carried by both of said members for engaging the twig at opposite sides.

6. A machine of this character, having an endless conveyer, a plurality of twig grippers and scrapers carried thereby, each of the latter including two gripping members, a resilient twig contact member carried by one of said members, coöperative means carried by both of said members for engaging the twig at opposite sides, and means for preventing the twig from falling between the members during the conveying thereof.

In testimony that I claim the foregoing as my own, I have hereto affixed my signature in the presence of two witnesses.

ALBERT O. POWELL.

Witnesses:
R. P. Perry,
Mary Witwen.

Copies of this patent may be obtained for five cents each, by addressing the "Commissioner of Patents, Washington, D. C."